March 15, 1932.  J. W. HACKER ET AL  1,849,923
PRODUCTION OF AMMONIUM CHLORIDE FROM COKE OVEN GASES AND THE LIKE
Filed Oct. 1, 1928
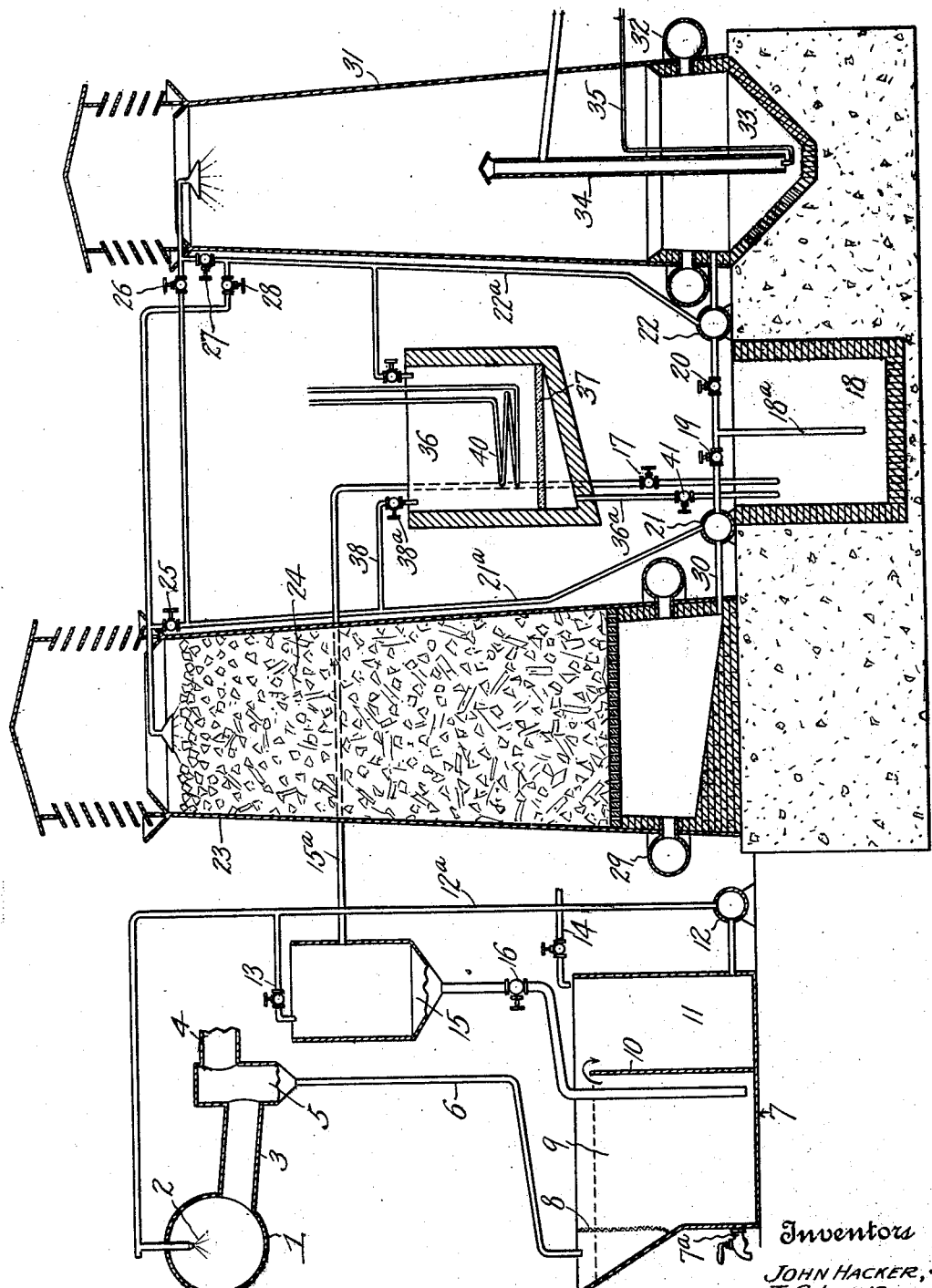
WITNESS
Oliver N. Holmes
Inventors
JOHN HACKER, +
T. C. LLOYD
By their Attorneys
Knight Bros Patented Mar. 15, 1932

1,849,923

UNITED STATES PATENT OFFICE

JOHN W. HACKER, OF YONKERS, AND THEODORE C. LLOYD, OF NEW YORK, N. Y.

PRODUCTION OF AMMONIUM CHLORIDE FROM COKE OVEN GASES AND THE LIKE

Application filed October 1, 1928. Serial No. 309,575.

The present invention relates to the production of ammonium chloride of a high degree of purity, such as would be suitable for galvanizing. Ammonium chloride, as is well-known, is one of the primary compounds of ammonia formed in the carbonization of coal in by-product coke oven and gas plants, and is found in the weak ammonia liquor of such plants. Many proposals for the treatment of the gases and liquors to recover the ammonia content have been made, that which is most commonly practiced is to withdraw such liquor from the main without concentration and decompose the ammonium chloride by addition of lime, the chlorine content of the liquor going to waste as calcium chloride.

The liberated ammonia is passed into the saturator where it is neutralized with sulphuric acid to form ammonium sulphate. Ammonium sulphate finds its principal market for use as a fertilizer. Since the market price of ammonium chloride is higher than that of the sulphate, many attempts have been made in practice to obtain the chloride directly. An important use of the ammonium chloride is in galvanizing. For such use, the ammonium chloride is required in a high degree of purity. The direct production of ammonium chloride from coke oven gases and the like has met with no appreciable success, due to the great difficulty which has been experienced in obtaining the chloride in a sufficiently pure form. The crystals directly obtained from the ammonia liquor by simple concentration have invariably been contaminated with tarry matter, including phenolic bodies, so that the product was not acceptable for galvanizing purposes. The difficulty of avoiding contamination of the product by such tarry and phenolic impurities, and the highly corrosive nature of the salt, have been the principal hindrances to the successful production of ammonium chloride, suitable for the galvanizing trade, directly from the coke oven gases and the like.

An important object of the present invention is to obtain ammonium chloride directly from coke oven gases and the like, in such a high degree of purity and of such good color as to be acceptable in the galvanizing trade. In the attainment of this object, it is necessary, or highly desirable, that no substantial interference with the general operations of by-product recovery be introduced, and that strict economy be observed, if there is to be any commercial success attending the recovery of the ammonium chloride. To these ends, our invention provides a concentrating and crystallizing process which involves a minimum of modification of the existing process for the general operation of by-product recovery, while ensuring a highly efficient and economical purification of the ammonium chloride from the hitherto unavoidable traces of tarry and phenolic bodies, in the product.

According to our invention, the absorption of the ammonium chloride from the hot gases, and its preliminary concentration in solution, are carried out with a view to the substantial elimination of tarry and phenolic matter from the solution at the earliest possible stage, so far as economically practicable, and the remaining traces of colloidal and phenolic impurities are removed from the solution by a further treatment, prior to the actual crystallization of the ammonium chloride. This clarification of the solution prior to crystallization may, within the broad aspect of our invention, be accomplished in different ways, but a particular feature of the improved method, in a more specific sense, contemplates the use of activated carbon for this purpose. We have found that activated carbon is very effective in removing the final traces of such impurities as colloidal and phenolic impurities from the ammonia liquor, and when the preliminary steps in the process of absorption and concentration have been carried out with a view to minimizing the amount of such impurities, such means may be employed with good economy. To more clearly set forth the principles of the invention, and to illustrate by way of example the operation of a plant under the principles of the invention, reference will be made to the accompanying drawing.

Said drawing represents diagrammatically, in elevation, the ammonium chloride recovery apparatus applied to the treatment of coke oven gases.

In the drawing, the collecting main is indicated at 1, this main being for example as used in standard practice in by-product recovery in connection with coke oven operation. The hot gases coming from the coke ovens and entering the collecting main 1, are cooled by sprays of liquor 2. Some of this liquor is evaporated by heat taken from the gases and passes over with the gas through the mains 3 and 4 to the primary coolers (not shown), of the usual by-product recovery plant. The hot gases entering the collecting main 1 contain ammonium chloride of which about 90% is absorbed by the liquor from the sprays, and together with the condensed tar flows through the downcomer 5 and gravity line 6 to the hot drain tank 7. In entering the hot drain tank 7, the pitch is screened out by wire mesh 8, the remaining liquid passing into the settling chamber 9, where the heavier tar and much of the phenolic impurities separate by gravity from the lighter liquor, and from this chamber the latter flows over the baffle 10 to the liquor compartment 11. A preliminary separation of tar and phenolic impurities from the ammonia liquor is thus accomplished in the settling chamber 9. As this tar accumulates, it may from time to time be drawn off through the discharge pipe 7ª. From the liquor compartment 11, the liquor, largely freed from tar, is forced by pump 12 through pipe line 12ª back to the spray discharge 2. The contact of the hot unsaturated gases coming from the ovens with sprays of liquor has two effects—(1) part of the weak liquor is evaporated by the sensible heat of the gas; (2) the ammonium chloride evolved with the gas is washed out by the sprays of liquor with which it comes in intimate contact.

By continuous separation of tar from the liquor, contamination is reduced to a minimum, and purification is further aided by the decreasing solubility of colloidal and phenolic matter in the liquor as its fixed ammonia content is increased above that found in normal operation. Since there will be a loss of circulating liquor by evaporation in the collecting main 1, and since a portion of this circulating liquor after concentrating is to be drawn off for further concentration, purification and recovery of ammonium chloride, we provide a valved pipe 14, which may be connected with the primary cooler (not shown) for introducing make-up liquor into this portion of the system.

Leading from the pipe 12ª is a valved discharge pipe 13, through which the ammonia liquor delivered by pipe 12ª may be partly discharged into the settling and storage tank 15 on its way to the further concentration and purification steps. In this settling and storage tank 15, the liquor is freely exposed to atmospheric oxidation whereby precipitation of colloidal impurities is promoted. These precipitated impurities are allowed to settle out of the liquor, and may be discharged therefrom through the valved outlet 16 from time to time. A pipe 15ª leads from the side of the settling tank 15 and extends to a position over a sump 18, into which the liquor may be discharged under the control of the valve 17. From this sump 18 the liquor is withdrawn through pipe 18ª and open valve 19 on the suction line of pump 21 (valve 20 being closed), is pumped through the discharge line 21ª, through the open valve 25, and over the concentrating tower 23 which has a suitable filling 24 of acid-proof material through which the liquor falls to the bottom of the tower, returning through suction line 30 to pump 21 for recirculation. A bustle pipe 29 is provided round the base of concentrating tower 23 to deliver hot air under pressure, which passes upward through the tower and thus heats, and at the same time concentrates, the ammonium chloride liquor which is falling through the acid-proof filling 24. This operation is preferably carried on to a point at which the liquor is just below a state of saturation. Thereafter the valve 25 may be closed and the concentrated hot liquor be introduced through pipe 38 under the control of valve 38ª into a filter 36 which has, for example, a bed 37 of porous silica plate. A steam heating coil 40 may be provided in the filter 36 for further heating or for maintaining the temperature of the concentrated liquor. It is preferred that the activated carbon for clarifying the solution be employed at this point in the process, but it will be understood that it might be employed elsewhere, if desired. The activated carbon is introduced into the filter 36, and after about thirty minutes agitation with the concentrated liquor, during which time the temperature is maintained by the steam coil 40, the clarified liquor may be drawn off through the filter bed 37, which will retain the carbon and the colloidal and phenolic substance removed from the liquor. The discharge pipe 36ª, leading from the bottom of the filter 36, is controlled by a valve 41 and delivers the clarified liquor into the sump 18. Having clarified the concentrated liquor and returned it to sump 18, this liquor may again be picked up by pump 21, and on closing valve 25 and opening valve 26, the liquor may be pumped over the crystallizing tower 31. Valve 27 is closed during this operation. In the crystallizing tower 31, the hot clarified liquor, which was approximately saturated at the working temperature, is cooled by an upward current of cold air introduced into the bottom of the tower through bustle pipe 32, so that the crystallization of ammonium chloride occurs. This tower is preferably devoid of filling, so that the liquid and crystals are free to separate, the latter settling to the bottom of trough 33 from which they are removed through the air ejector 34 supplied with compressed air through the pipe 35, in well-known manner, and delivered to the usual drain table and centrifugal dryer. The supernatant liquor in trough 33 may be drawn off through the suction line of pump 22 and discharge through line 22ª and the open valve 28 to the top of the concentrating tower 23 for further concentration.

In the operation of the system above outlined, the concentration may be either continuous or intermittent.

The liquor temperatures and concentrations in concentrating and crystallizing towers are governed by the temperatures and volumes of hot and cold air supplied to these towers, since a state of equilibrium must eventually be obtained.

The method is designed to minimize the decomposition of ammonium chloride and the corrosion of apparatus by it, by keeping the temperatures as low as possible.

It may be stated that it has been found advantageous to operate with a concentration of from 70 to 100 grams of ammonium chloride per liter of liquor in the circulating system of the by-product plant. The concentration and crystallization of ammonium chloride may, of course, in practice, be conducted as a continuous or intermittent operation by the adoption of suitable apparatus, but the present invention does not relate so much to the specific details of construction as it does to the principles of purification and concentration, and hence the apparatus shown will suffice to make the invention clear.

The treatment of the solution with activated carbon is a feature of particular importance as a specific detail, but it is to be understood that in a broader sense the clarification of the solution may be accomplished in other ways, such as for example, by treatment with chlorine gas, which we have found effective in precipitating the impurities so that a clear solution of ammonium chloride may be obtained therefrom by filtration. It is also to be noted that whether one clarifying agent or another be employed, it is not indispensable, although it is we believe preferable, to apply this treatment to the liquor after the concentration of the liquor to approximately a state of saturation, because at this stage the minimum quantity of purifying agent is required. It must, of course, be borne in mind that the temperature of the concentrated solution during this clarifying treatment must not be allowed to drop below that at which the solution is saturated. Furthermore, the effect of activated carbon is greatly increased by raising the temperature.

We claim:—

1. The method of obtaining ammonium chloride from coke oven gases and the like, which comprises passing the ammonia liquor repeatedly through the hot gases from the ovens, to take up ammonium chloride therefrom, with an intervening treatment to remove tar, subsequently treating the liquor with a clarifying agent for the elimination of colloidal and phenolic impurities, and thereafter crystallizing the ammonium chloride from the liquor.

2. The method of obtaining ammonium chloride from coke oven gases and the like which comprises washing the hot gases with ammonia liquor, settling out tar, concentrating the solution to near the saturation point, treating the concentrated solution with a clarifying agent to free it from colloidal and phenolic impurities, and crystallizing the ammonium chloride from the clarified solution.

3. The method of obtaining ammonium chloride from coke oven gases and the like, which comprises passing the ammonia liquor repeatedly through the hot gases from the ovens, to take up ammonium chloride therefrom, with an intervening treatment to remove tar, subjecting the liquor to the clarifying action of activated carbon to remove colloidal and phenolic impurities, and thereafter crystallizing the ammonium chloride from the clarified liquor.

4. The method of obtaining ammonium chloride from coke oven gases and the like, which comprises passing the ammonia liquor repeatedly through the hot gases from the ovens, to take up ammonium chloride therefrom, settling out tar, treating the liquor with chlorine to precipitate colloidal and phenolic impurities and thereafter crystallizing the ammonium chloride from the liquor.

JOHN W. HACKER.
THEODORE C. LLOYD.